US012686830B2

(12) United States Patent (10) Patent No.: US 12,686,830 B2
Daugs et al. (45) Date of Patent: Jul. 21, 2026

(54) ESTERIFIED OIL SOLUBLE POLYALKYLENE GLYCOLS

(71) Applicant: Dow Global Technologies LLC, Midland, MI (US)

(72) Inventors: Edward Daugs, Midland, MI (US); Martin R. Greaves, Horgen (CH); Yaokun Han, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 1205 days.

(21) Appl. No.: 17/632,818

(22) PCT Filed: Aug. 8, 2019

(86) PCT No.: PCT/CN2019/099755
§ 371 (c)(1),
(2) Date: Feb. 4, 2022

(87) PCT Pub. No.: WO2021/022541
PCT Pub. Date: Feb. 11, 2021

(65) Prior Publication Data
US 2022/0306961 A1 Sep. 29, 2022

(51) Int. Cl.
| | |
|---|---|
| *C10M 107/34* | (2006.01) |
| *C08G 65/04* | (2006.01) |
| *C08G 65/332* | (2006.01) |
| *C10N 20/02* | (2006.01) |
| *C10N 30/20* | (2006.01) |

(52) U.S. Cl.
CPC ........... *C10M 107/34* (2013.01); *C08G 65/04* (2013.01); *C08G 65/3322* (2013.01); *C10M 2209/1095* (2013.01); *C10N 2020/02* (2013.01); *C10N 2030/20* (2013.01)

(58) Field of Classification Search
CPC ........ C10M 107/34; C10M 2209/1095; C08G 65/04; C08G 65/3322; C10N 2020/02; C10N 2030/20
See application file for complete search history.

(56) References Cited

U.S. PATENT DOCUMENTS

| | | |
|---|---|---|
| 2,620,304 A | 12/1952 | Stewart et al. |
| 2,620,308 A | 12/1952 | Stewart et al. |

| | | |
|---|---|---|
| 3,381,022 A | 4/1968 | Le Suer |
| 3,530,070 A | 9/1970 | Wickings et al. |
| 4,031,118 A | 6/1977 | Miller |
| 4,116,872 A | 9/1978 | Jahnke |
| 4,959,169 A | 9/1990 | Mcgraw et al. |
| 4,968,453 A | 11/1990 | Wada et al. |
| 5,470,822 A | 11/1995 | Younes |
| 5,707,945 A | 1/1998 | Cooban et al. |
| 9,481,629 B2 | 11/2016 | Merenov et al. |
| 9,809,529 B2 | 11/2017 | Frycek et al. |
| 9,908,839 B2 | 3/2018 | Frycek et al. |
| 10,113,134 B2 | 10/2018 | Khelidj et al. |
| 2014/0249063 A1 | 9/2014 | Greaves et al. |
| 2017/0211009 A1 | 7/2017 | Khelidj et al. |

FOREIGN PATENT DOCUMENTS

| | | |
|---|---|---|
| CN | 1084523 | 3/1994 |
| EP | 0340302 | 11/1989 |
| EP | 0664331 | 7/1995 |
| JP | H0368401 | 3/1991 |
| JP | 2003155339 | 5/2003 |
| WO | 2014124698 | 8/2014 |

OTHER PUBLICATIONS

Lubr. Sci. 2012, 24, 251-262, pp. 1-13 (Greaves et al.) (Year: 2012).*
Practical Process Research and Development, 2000, pp. 44-47 and 106 (Anderson) (Year: 2000).*
Lube Magazine 2013, 118, 22-27 (Greaves-2) (Year: 2013).*
ASTM D7042 Standard Manual (Year: 2016).*
International Search Report & Written Opinion for related PCT Application PCT/CN2019/099755, mailed May 13, 2020 (9 pgs).
Kukrety, et al., "Development of a Biodegradable/Ecofriendly Turbine Lubricant from a Novel Polyalkylene Glycol Ester"; Waste and Biomass Valorization, vol. 9, No. 7, Jul. 31, 2018 (8 pgs).

* cited by examiner

*Primary Examiner* — Amy C Bonaparte
*Assistant Examiner* — Derek Rhoades

(57) ABSTRACT

Embodiments of the present disclosure are directed processes to produce a low-color esterified oil soluble polyalkylene glycol, the process comprising forming a reaction mixture including a low viscosity oil soluble polyalkylene glycol and an excess amount of valeric acid, where the reaction mixture is formed in the presence of a catalytic amount of ortho-phosphoric acid catalyst to yield an organic phase including the low-color esterified oil soluble polyalkylene glycol.

11 Claims, No Drawings

ESTERIFIED OIL SOLUBLE POLYALKYLENE GLYCOLS

This application is a National Stage Application under 35 U.S.C. § 371 of International Application Number PCT/CN2019/099755, filed Aug. 8, 2019 and published as WO 2021/022541 A1 on Feb. 11, 2021, the entire contents of which are incorporated herein by reference in its entirety.

FIELD OF DISCLOSURE

Embodiments of the present disclosure are directed towards esterified polyalkylene glycols and more specifically to processes to produce low-color esterified oil soluble polyalkylene glycols.

BACKGROUND

Lubricants can be utilized for a variety of applications. Lubricants can have various functions, such as controlling friction between surfaces of moving parts, reducing wear of moving parts, reducing corrosion of surfaces of moving parts, damping mechanical shock, and/or forming a seal.

SUMMARY

The present disclosure provides processes to produce a low-color esterified oil soluble polyalkylene glycols. For instance, the present disclosure provides a process to produce a low-color esterified oil soluble polyalkylene glycol by forming a reaction mixture including a low viscosity oil soluble polyalkylene glycol and an excess amount of valeric acid, where the reaction mixture is formed in the presence of a catalytic amount of ortho-phosphoric acid catalyst to yield the low-color esterified oil soluble polyalkylene glycol. In various embodiments the low viscosity oil soluble polyalkylene glycol has a theoretical normal boiling point that is greater than a normal boiling of the valeric acid.

The low-color esterified oil soluble polyalkylene glycols can have a color as determined in accordance with ASTM D1209 of less than 110 American Public Health Association (APHA) units, less than 100 APHA units, or less than 70 APHA units. The low-color esterified oil soluble polyalkylene glycols of the present disclosure can have a kinematic viscosity at 100° C. ($KV_{100}$) as determined in accordance with ASTM D7042 of 4 millimeters$^2$ (mm$^2$)/second (cSt) or less or 3.2 mm$^2$/second or less. The low-color esterified oil soluble polyalkylene glycols of the present disclosure can also have a viscosity index determined according to ASTM D2270 greater than 150 or 160. For instance, in some embodiments, the low-color esterified oil soluble polyalkylene glycols of the present disclosure can have a viscosity index as determined in accordance with ASTM D2270 of greater than 160 and has a color in accordance with ASTM D1209 of less than 100 APHA units, among other possibilities.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

The present disclosure process to produce a low-color esterified oil soluble polyalkylene glycol by forming a reaction mixture including a low viscosity oil soluble polyalkylene glycol and an excess amount of valeric acid, where the reaction mixture is formed in the presence of a catalytic amount of ortho-phosphoric acid catalyst to yield the low-color esterified oil soluble polyalkylene glycol. In various embodiments the low viscosity oil soluble polyalkylene glycol has a theoretical normal boiling point that is greater than a normal boiling of the valeric acid.

The low-color esterified oil soluble polyalkylene glycols disclosed herein can have one or more properties that are desirable for various applications.

For instance, the processes herein provide for low-color esterified oil soluble polyalkylene glycols that are desirably low in color. That is, generally color may result from decomposition of one of the reactants and/or side reactions, such as side reactions when forming an oil soluble polyalkylene glycol. For instance, processes employed with starting components such as bis-dipropylene glycol n-butyl ether (normal boiling point 230 degrees Celsius) with relatively low boiling points may have difficulty obtaining a product that is relatively free of odor and color if attempting to employ glycol ethers having higher normal/theoretical boiling points. However, the process herein provides for low-color esterified oil soluble polyalkylene glycols having a color of less than 110 APHA units, less than 100 APHA units, or less than 70 APHA units, in various embodiments. For instance, in some embodiments the low viscosity oil soluble polyalkylene glycol starting component, as detailed herein, has a theoretical normal boiling point that is greater than a normal boiling of the acid present e.g., valeric acid, in contrast to other approaches such as those detailed in U.S. Pat. No. 9,908,839 B2 which employ low normal boiling point glycol ethers and/or glycol ethers having a boiling point that is less than a corresponding acid (adipic acid and/or benzoic acid).

Further, the processes described herein provide for low-color esterified oil soluble polyalkylene glycols herein can provide higher viscosity index values, as compared to some other lubricants. Viscosity index is a measure of how the viscosity of the lubricant changes with temperature between 40 and 100° C. For lubricants, relatively lower viscosity index values (e.g. <120) can indicate a greater reduction in a lubricant's viscosity at higher temperatures, as compared to a lubricant having a relatively higher viscosity index value (e.g. >150). As such, for a number of applications, relatively higher viscosity index values are advantageous so that the lubricant maintains a generally steady viscosity with less pronounced viscosity changes for extremes of temperatures that go from lower temperatures to higher temperatures. The low-color esterified oil soluble polyalkylene glycols disclosed herein can provide higher viscosity index values, as compared to some other lubricants.

Further, some lubricants, such as low viscosity lubricants which are herein defined as having a kinematic viscosity at 40° C. of less than 15 centistokes (cSt) and/or a kinematic viscosity at 100° C. of 4 cSt or less, are more volatile, e.g., as compared to high viscosity lubricants. The low color esterified oil soluble polyalkylene glycols disclosed herein are low viscosity lubricants, i.e. the low-color esterified oil soluble polyalkylene glycols disclosed herein, have a kinematic viscosity at 40° C. of less than 15 cSt and a kinematic viscosity at 100° C. of 4 cSt or less. That is, the processes of the present disclosure provide esterified oil soluble polyalkylene glycols that can have a kinematic viscosity at 40° C. of less than 15 cSt and a kinematic viscosity at 100° C. of 4 cSt or less, and therefore can be considered low viscosity lubricants, i.e., low viscosity esterified oil soluble polyalkylene glycols. Low viscosity lubricants having a relatively lower viscosity, e.g., kinematic and/or dynamic, at low temperatures, such as at or below 0° C., can advantageously help to provide lower energy losses, such as when pumping the lubricant around an automotive engine. The processes herein provide low-color esterified oil soluble polyalkylene glycols that can have relatively lower viscosities e.g., kinematic and/or dynamic, at low temperatures, as compared to some other lubricants.

As mentioned, the low-color esterified oil soluble poly-alkylene glycols disclosed herein are formed by reacting an oil soluble polyalkylene glycol and an acid. Unlike mineral oil base oils, oil soluble polyalkylene glycols have a significant presence of oxygen in the polymer backbone. Embodiments of the present disclosure provide that oil soluble polyalkylene glycols are alcohol initiated copolymers of propylene oxide and butylene oxide, where units derived from butylene oxide are from 50 weight percent to 95 weight percent based upon a total of units derived from propylene oxide and butylene oxide. All individual values and subranges from 50 weight percent to 95 weight percent are included; for example, the oil soluble polyalkylene glycol can have units derived from butylene oxide from a lower limit of 50, 55, or 60 weight percent to an upper limit of 95, 90, or 85 weight percent based upon the total of units derived from propylene oxide and butylene oxide. For the various embodiments, the propylene oxide can be 1,2-propylene oxide and/or 1,3-propylene oxide. For the various embodiments, the butylene oxide can be selected from 1,2-butylene oxide or 2,3-butylene oxide. Preferably, 1,2-butylene oxide is used in forming the oil soluble polyalkylene glycol.

The alcohol initiator for the oil soluble polyalkylene glycol can be a monol, a diol, a triol, a tetrol, or a combination thereof. Examples of the alcohol initiator include, but are not limited to, monols such as methanol, ethanol, butanol, octanol and dodecanol. Examples of diols are ethylene glycol, 1,2-propylene glycol, 1,3-propylene glycol and 1,4 butanediol. Examples of triols are glycerol and trimethylolpropane. An example of a tetrol is pentaerythritiol. Combinations of monols, diols, triols and/or tetrol can be used. The alcohol initiator can include from 1 to 30 carbon atoms. All individual values and subranges from 1 to 30 carbon atoms are included; for example, the alcohol initiator can have from a lower limit of 1, 3, or 5 carbon atoms to an upper limit of 30, 25, or 20 carbon atoms.

The oil soluble polyalkylene glycols can be prepared by a known process with known conditions. The oil soluble polyalkylene glycols can be obtained commercially. Examples of commercial oil soluble polyalkylene glycols include, but are not limited to, oil soluble polyalkylene glycols under the trade name UCON™, such as UCON™ OSP-12 and UCON™ OSP-18 both available from The Dow Chemical Company.

The acid that is reacted with the oil soluble polyalkylene glycol to form the low-color esterified oil soluble polyalkylene glycols disclosed herein can be a valeric acid. Examples of the acid include, but are not limited to, acetic acid, propanoic acid, valeric acid, e.g., isovaleric acid, n-pentanoic acid, caprylic acid, dodecanoic acid, combinations thereof. For instance, in some embodiments, the acid can be valeric acid to form the low-color esterified oil soluble polyalkylene glycols disclosed herein, the oil soluble polyalkylene glycol and the acid can be reacted with an excess amount of acid such as valeric acid, in contrast to other approaches that employ a molar excess of oil soluble polyalkylene glycol. For instance, in some embodiments, the process herein can employ a molar ratio of 1.01 moles of acid:1 mole of oil soluble polyalkylene glycol to 10 moles of acid:1 mole of oil soluble polyalkylene glycol or greater. All individual values and subranges from 1.01:1 moles of acid to moles of oil soluble polyalkylene glycol to 10 moles of acid:1 mole of oil soluble polyalkylene glycol are included. For example acid and oil soluble polyalkylene glycol can be reacted at a molar ratio of 10:1, 9:1, 8:1, 7:1, 6:1, 5:1, 4:1, 3:1, 2:1, 1.5, 1.01 moles of acid to oil soluble polyalkylene glycol (i.e., polyether).

The low-color esterified oil soluble polyalkylene glycols can be prepared with process as described herein with known conditions. For instance, the low-color esterified oil soluble polyalkylene glycols disclosed herein can be formed by an esterification process, e.g., Fisher Esterification. For the esterification, known components such as acid catalysts, neutralizers, and/or salt absorbers, among other known components, can be utilized. Examples of neutralizers are sodium carbonate, sodium hydroxide, and potassium hydroxide, among others. An example of a salt absorber is magnesium silicate, among others.

An example of an acid catalyst is phosphoric acid e.g., Ortho-phosphoric acid. In some embodiments, the acid catalyst can have a pKa of 2 or more. For instance, in some embodiments the acid catalyst can be Ortho-phosphoric acid which has a pKa of 2.16. The acid catalyst can be present in a catalytic amount to produce low-color esterified oil soluble polyalkylene glycols, as described herein, e.g., present in an amount from 0.1 to 5.0 weight percent of a total weight of a reaction mixture. For instance, in some embodiments an amount of the acid catalyst can be about 0.8 weight percent of a reaction mixture such as those described herein. In some embodiments, the phosphoric acid is supplied as an aqueous solution of 85% phosphoric acid.

The processes of the present disclosure provide low-color esterified oil soluble polyalkylene glycols that can have a color as determined in accordance with ASTM D1209 of less than 110 APHA units. For instance, the color can be less than 110 APHA, less than 100 APHA units, or less than 70 APHA units. In some embodiments, the low-color esterified oil soluble polyalkylene glycols can have a color from 27 to 63. All individual values and subranges from 27 to 63 are included; for example, the low-color esterified oil soluble polyalkylene glycols of the present disclosure can have a color from a lower limit of 27 or 34 to an upper limit of 40, 59, or 63.

The processes of the present disclosure provide low-color esterified oil soluble polyalkylene glycols that can have a kinematic viscosity at 100° C. that is 4 cSt or less or 3.2 cSt or less. The low-color esterified oil soluble polyalkylene glycols can have a kinematic viscosity, as determined by ASTM D7042, at 100° C. from a lower limit of 2.8, 3.0, or 3.2 cSt to an upper limit of 3.9, 4.0, or 4.1 cSt. The processes of the present disclosure provide low-color esterified oil soluble polyalkylene glycols that can have a kinematic viscosity at 40° C. that is less than 15 cSt. For instance, the processes of the present disclosure provide low-color esterified oil soluble polyalkylene glycols that can have a kinematic viscosity, as determined by ASTM D7042, at 40° C. from a lower limit of 10 cSt to an upper limit of 15 or 13 cSt. In various embodiments, the low-color esterified oil soluble polyalkylene glycols disclosed herein have a kinematic viscosity at 40° C. of less than 15 cSt and a kinematic viscosity at 100° C. of 4 cSt or less. As such, the low-color esterified oil soluble polyalkylene glycols can advantageously be utilized as low viscosity lubricants and/or for various low viscosity lubricant applications.

The processes of the present disclosure provide low-color esterified oil soluble polyalkylene glycols that can have a viscosity index determined according to ASTM D2270 of greater than 150. For instance, in some examples the low-color esterified oil soluble polyalkylene glycols can have a viscosity index in a range from 150 to 180. All individual values and subranges from 150 to 180 are included; for example, the low-color esterified oil soluble polyalkylene glycols of the present disclosure can have a viscosity index from a lower limit of 150 or 160 to an upper limit of 170 or 180.

The processes of the present disclosure provide low-color esterified oil soluble polyalkylene glycols are solvent-free. As used herein, being solvent-free refers to a process that employs less than 1.0%, less than 0.5%, less than 0.1 percent by weight of total reactants, or 0.0 percent by weight of total weight of the reaction mixture to form low-color esterified oil soluble polyalkylene glycols. For instance, in some embodiments, the process can employ zero solvent (0.0 percent by weight of total weight of the reaction mixture) when forming the low-color esterified oil soluble polyalkylene glycols, as detailed herein. Examples of solvents include toluene, xylenes, benzene, cyclohexane, heptane, and the other solvents that are inert to the reaction conditions/components used, facilitate water removal by distillation, and boils at an acceptable temperature such as those described herein.

The processes of the present disclosure provide low-color esterified oil soluble polyalkylene glycols that, as discussed herein, are oil soluble (are soluble) in a base oil. For example, 10 to 0.01 wt. % of the low-color esterified oil soluble polyalkylene glycols of the present disclosure can be solubilized in 90 to 99.9 weight percent (wt. %) of a base oil at ambient temperature (23° C.) to produce a clear homogeneous mixture, where the wt. % is based on the total weight of mixture of the low-color esterified oil soluble polyalkylene glycol(s) and the base oil.

As used herein, the base in which the low-color esterified oil soluble polyalkylene glycols of the present disclosure are soluble can be selected from the group consisting of an American Petroleum Institute (API) Group I hydrocarbon base oil, an API Group II hydrocarbon base oil, an API Group III hydrocarbon base oil, an API Group IV hydrocarbon base oil and a combination thereof. Preferably, the base oil of the lubricant formulation is an API Group III hydrocarbon base oil. The composition of API Group I-IV hydrocarbon oils are as follows. Group II and Group III hydrocarbon oils are typically prepared from conventional Group I feed stocks using a severe hydrogenation step to reduce the aromatic, sulfur and nitrogen content, followed by de-waxing, hydro-finishing, extraction and/or distillation steps to produce the finished base oil. Group II and III base stocks differ from conventional solvent refined Group I base stocks in that their sulfur, nitrogen and aromatic contents are very low. As a result, these base oils are compositionally very different from conventional solvent refined base stocks. The API has categorized these different base stock types as follows: Group I, >0.03 wt. % sulfur, and/or <90 vol % saturates, viscosity index between 80 and 120; Group II, ≤0.03 wt. % sulfur, and ≥90 vol % saturates, viscosity index between 80 and 120; Group III, ≤0.03 wt. % sulfur, and ≥90 vol % saturates, viscosity index >120. Group IV are poly-alphaolefins (PAO). Hydrotreated base stocks and catalytically dewaxed base stocks, because of their low sulfur and aromatics content, generally fall into the Group II and Group III categories.

Embodiments of the present disclosure provide include processes that provide the low-color esterified oil soluble polyalkylene glycols that are oil soluble, e.g., the low-color esterified oil soluble polyalkylene glycols exhibit miscibility in API Group I, mineral oils at weight percent levels from 10/90 to 90/10 low-color esterified oil soluble polyalkylene glycol/mineral oil. An example of a Group I mineral oil is Total 150SN available from Total.

Embodiment of the present disclosure provide processes to produce a low-color esterified oil soluble polyalkylene glycol. The processes can include forming a reaction mixture including a low viscosity oil soluble polyalkylene glycol and an excess amount of valeric acid. The reaction mixture can be formed in the presence of a catalytic amount of ortho-phosphoric acid catalyst to yield the low-color esterified oil soluble polyalkylene glycol, as described herein.

In some embodiments, the process can include removing a remaining amount of the excess amount of valeric acid following formation of the low-color esterified oil soluble polyalkylene glycol and removing the catalytic amount of ortho-phosphoric acid following removal of the remaining amount of the excess amount of valeric acid. In such embodiments, the process can further include recycling the removed remaining amount of the excess amount of valeric acid as an input to the process. For instance, in some embodiments, the remaining amount of the excess amount of valeric acid can be removed by vacuum distillation (formation of an azeotrope with water which can be readily distilled/vacuum distilled) and aqueous base extraction, among other possibilities.

In some embodiments, the process can include removing the low-color esterified oil soluble polyalkylene glycol from an organic phase and drying the removed low-color esterified oil soluble polyalkylene glycol to yield a dry low-color esterified oil soluble polyalkylene glycol. In such embodiments, the dry low-color esterified oil soluble polyalkylene glycol has less than about 5 weight percent, less than 4 weight percent, less than 3, weight percent, or less than 2 weight percent by weight of oil soluble polyalkylene glycol based on a total weight of the dried low-color esterified oil soluble polyalkylene glycol.

EXAMPLES

In the Examples, various terms and designations for materials are used including, for instance, the following:

OSP-1 (oil soluble polyalkylene glycol, UCON™ OSP-12, dodecanol initiated random copolymer [50 weight percent propylene oxide/50 weight percent butylene oxide; average molecular weight 374 g/mole, pKa value in a range from 16 to 17 at 25° C.], available from The Dow Chemical Company); OSP-2 (oil soluble polyalkylene glycol, UCON™ OSP-18, dodecanol initiated random copolymer [50 weight percent propylene oxide/50 weight percent butylene oxide; average molecular weight 467 g/mole pKa value in a range from 16 to 17 at 25° C.], available from The Dow Chemical Company); p-toluenesulfonic acid [PTSA] (acid catalyst, available from Sinopharm Chemical Reagent Co. Ltd (SCRC); phosphoric acid (acid catalyst, available from Sigma-Aldrich); sodium hydroxide (neutralizer, available from Sigma-Aldrich), magnesium silicate (MagSil, salt absorber, available from Dallas Group); valeric acid (n-pentanoic acid) (acid, available from Dow Chemical Company);

Example 1 (Ex. 1) was formed as Example 6, with the change that OSP-1 rather than OSP-2 in Example 6, with the ratios of Table 1 to obtain approximately 1064 g of Example 1.

Example 2 (Ex. 2) was formed as Example 6, with the change that OSP-1 rather than OSP-2 in Example 6, with the ratios of Table 1 to obtain approximately 1500 g of Example 2.

Example 3 (Ex. 3) was formed as Example 6, with the change that OSP-1 rather than OSP-2 in Example 6, with the ratios of Table 1 to obtain approximately 1465 g of Example 3.

Comparative Example A (C. Ex. A) was formed as follows. OSP-1 (374 g, 1 mole) and valeric acid (102 g, 1 mole) in toluene (500 mL, 434 g) were mixed with 1.90 g (0.001 mole) of para-toluenesulfonic acid, and distilled at 135° C. using a Dean-Stark trap to remove 18.0 mL of water. After cooling, 1.12 g (0.002 moles) of potassium hydroxide was added, then 10 g of MagSil was added and the slurry warned to 60° C. before filtering. Solvent was removed by vacuum evaporation to afford 388 g of a yellow liquid.

Example 4 (Ex. 4) was formed as Example 6 with the ratios of Table 2 to obtain approximately 1091 g of Example 4.

Example 5 (Ex. 5) was formed as Example 6 with the ratios of Table 2 to obtain approximately 1504 g of Example 5.

Comparative Example B (C. Ex. B) was formed as follows. OSP-2 (350 g, 0.75 mole) and valeric acid (76.5 g, 0.75 mole) in toluene (500 mL, 434 g) were mixed with 1.42 g (0.0075 mole) of para-toluenesulfonic acid, and distilled at 165° C. using a Dean-Stark trap to remove 13.0 mL of water. After cooling, 50 g of sodium carbonate was added, then 10 g of MagSil was added and the slurry warned to 60° C. before filtering. Solvent was removed by vacuum evaporation to afford 330 g of a yellow liquid.

Example 6 (Ex.1), process to produce a low-color esterified oil soluble polyalkylene glycol as follows. A 3-liter (L) round-bottom glass flask with magnetic stirring in a temperature controlled heating mantle and topped with a 12" tall 1" diameter vacuum jacketed and silvered Vigreux distillation column topped with a temperature-controlled water cooled reflux splitter was charged with OSP-2 (1352.5 grams (g); 2.90 mol), valeric acid (589.8 g; 5.77 moles), and phosphoric acid (24.86 g at 85%) to form a reaction mixture. A vacuum, supplied by a dry-ice protected Edwards Vacuum pump, was applied, and the reaction mixture was held at a pressure of less than about 667 pascals [5 torn] until gas generation stopped. The vacuum was adjusted to about 5333 pascals [40 torn] using a nitrogen bleed, and the reaction mixture was heated to reflux. Distillate was removed with a 1:1 reflux ratio at a maximum overhead temperature of 60 degrees Celsius (° C.) and a pot temperature of 120° C. over about 26 hours to remove 67.05 g of distillate. Vacuum was adjusted to about 24000 pascals [18 torn] and an additional 33.98 g of distillate was removed at a maximum head temperature of 70° C. The vacuum was adjusted to less than about 133 pascals [1 torr], and an additional 222.22 g (for a total of 323.25 g) of distillate was removed at a maximum overhead temperature of 90° C. and a pot temperature of 120° C. The solution was cooled to 50° C. and the vacuum released with nitrogen. A solution of 50.85 g of 50% aqueous sodium hydroxide in 645.48 g of water was added to the distillate with stirring to form a mixture. After stirring for one hour at 50° C., the pH of the mixture was 6.57. An additional 34.86 g of 20% aqueous sodium hydroxide was added, and stirring continued for another hour at 50° C. After stirring, the pH of the mixture was 10.74. The mixture was transferred to a 3-L separatory funnel, and the lower 754.31-g aqueous phase was removed. The upper organic phase (1539.8 g) was mixed with 49.26 g of anhydrous magnesium silicate to reduce/remove any residual acidity, and the resultant mixture was filtered under vacuum. A vacuum of less than 133 pascals [1 torn] was maintained over the filtrate for 2 to 4 hours to give a clear solution weighing 1508.0 g (94% yield, color of 40 APHA, 1.3 wt % OSP 2 by HPLC assay).

Kinematic viscosity was determined according to ASTM D7042 [$KV_{40}$ is the kinematic viscosity at 40° C., $KV_{100}$ is the kinematic viscosity at 100° C.]. Viscosity index [VI] was determined according to ASTM D2270. Color as determined according to ASTM D1209. The results are reported in Table 1 and Table 2

TABLE 1

| Components | C. Ex A Wt. (g) | Ex. 1 Wt. (g) | Ex. 2 Wt. (g) | Ex. 3 Wt. (g) |
|---|---|---|---|---|
| Polyether | | | | |
| OSP-1 | 374 | 957 | 1306 | 1305 |
| Catalyst | | | | |
| Para-toluene sulfonic acid (p-TSA) | 1.90 | *** | *** | *** |
| Ortho-phosphoric acid catalyst (85%) | *** | 24.1 | 25.1 | 29.4 |
| Acid | | | | |
| Valeric acid | 102 | 390 | 713 | 701 |
| Yield (g/%) | 388 (85%) | 1064 (91%) | 1500 (94%) | 1465 (92%) |
| Solvent in Process (wt %) | 48% | *** | *** | *** |
| Acid present in stoichometric excess to polyether | No | Yes | Yes | Yes |
| Molar ratio of Acid to polyether | 1.0 | 1.5 | 2.0 | 2.0 |
| Acid Lowest Boiling Component Other Than Water of Reaction | No | Yes | Yes | Yes |
| $KV_{40}$, mm$^2$/sec | 10.2 | 10 | 10.3 | 10.2 |
| $KV_{100}$, mm$^2$/sec | 3 | 3 | 3.1 | 3 |
| VI | 161 | 161 | 169 | 167 |
| Color, APHA | 131 | 40 | 34 | 27 |

TABLE 2

| Components | C. Ex B Wt. (g) | Ex. 4 Wt. (g) | Ex. 5 Wt. (g) | Ex. 6 Wt. (g) |
|---|---|---|---|---|
| Polyether | | | | |
| OSP-2 | 350 | 998 | 1355 | 1353 |
| Catalyst | | | | |
| Para-toluene sulfonic acid (p-TSA) | 1.42 | *** | *** | *** |
| Ortho-phosphoric acid catalyst (85%) | *** | 22.6 | 23.8 | 24.9 |
| Acid | | | | |
| Valeric acid | 76.5 | 335 | 592 | 590 |
| Yield (g/%) | 330 (80%) | 1091 (93%) | 1504 (94%) | 1508 (94%) |
| Solvent in process (wt %) | 50% | *** | *** | *** |
| Acid present in stoichometric excess to polyether | No | Yes | Yes | Yes |

TABLE 2-continued

| Components | C. Ex B Wt. (g) | Ex. 4 Wt. (g) | Ex. 5 Wt. (g) | Ex. 6 Wt. (g) |
|---|---|---|---|---|
| Molar ratio of Acid to polyether | 1.0 | 1.5 | 2.0 | 2 |
| Acid Lowest Boiling Component Other Than Water of Reaction | No | Yes | Yes | Yes |
| $KV_{40}$, mm²/sec | 15.7 | 14.7 | 14.5 | 13 |
| $KV_{100}$, mm²/sec | 4.1 | 3.9 | 3.9 | 3.4 |
| VI | 175 | 171 | 175 | 178 |
| Color, APHA | 140 | 59 | 63 | 40 |

*** corresponds to none present

The data of Tables 1 and 2 illustrates that each of Examples 1-6 has similar kinematic viscosity values [$KV_{40}$ and $KV_{100}$] and viscosity index [VI] values as those of Comparative examples A and B, yet Examples 1-6 each provide improved, i.e., lower color as compared to Comparative Examples A and B. Specifically, the color of Examples 1-6 is 40, 34, 27, 59, 63, and 40, respectively, whereas the color of Comparative Examples A and B is 131 and 140, respectively. That is, Examples 1-6 demonstrate improved lower color values as compared to the higher color values resulting from the more acidic catalyst (Para-toluene sulfonic acid (p-TSA; pKa=−1.34) employed by Comparative Examples A and B.

Notably, Examples 1-6 also employ an oil soluble polyalkylene glycol with a theoretical normal boiling point that is greater than a normal boiling of an acid (valeric acid; normal boiling point of 186° C.) reacted with the oil soluble polyalkylene glycol and have the acid present in a stoichiometric excess amount. Other than the water of reaction, the acid is the lowest boiling component of the reaction. That is, in practice the oil soluble polyalkylene glycol may thermally decompose prior to actually boiling/reaching a calculated normal boiling point of the oil soluble polyalkylene glycol. The thermal decomposition occurs above 250° C. and therefore its theoretical boiling point is above 250° C. Thus, a theoretical normal boiling point of oil soluble polyalkylene glycol refers to as a calculated normal boiling point that is above a decomposition temperature of the substance. As used herein, a normal boiling point refers to a temperature at which a substance boils at 1 atmosphere of pressure. As mentioned, Examples 1-6 remove a remaining amount of the excess amount of valeric acid following formation of the low-color esterified oil soluble polyalkylene glycol and then remove a catalytic amount of acid catalyst (ortho-phosphoric acid). Removing the acid catalyst (ortho-phosphoric acid) following removal of the remaining amount of the excess amount of acid is possible given that the low viscosity oil soluble polyalkylene glycol has a theoretical normal boiling point (e.g., at a temperature of greater than 250° C.) that is greater than a normal boiling of the acid. Without wishing to be bound by theory, it is believed that removing the acid catalyst following removal of the excess amount of acid desirably minimizes byproduct formation e.g., unsaturated by-products and/or colored by-products, as compared to other approaches that remove a glycol ether prior to removal of an acid. Further, employing the excess amount of acid desirably promotes driving a reaction to produce the low-color esterified oil soluble polyalkylene glycols to completion/theoretical maximum yield (as evidenced by the high yields in Tables 1 and 2). Further still, employing the excess amount of acid eases production of the low-color esterified oil soluble polyalkylene glycols as the excess amount of organic acid can be readily removed (given its lower boiling point than the polyether) and/or that the remaining amount of the excess amount of acid can be readily recycled as an input of the process. Further yet, avoiding the use of a solvent such as toluene in Comparative Examples A and B as the lowest boiling component other than the water of reaction eliminates the need to remove the solvent from the product in a separate isolation step, and increases the mass throughput of the process by avoiding diluting the reactive components with the reaction solvent.

What is claimed:

1. A process to produce a low-color esterified oil soluble polyalkylene glycol, the process comprising forming a reaction mixture including a low viscosity oil soluble polyalkylene glycol and an excess amount of valeric acid, wherein the reaction mixture is formed in the presence of a catalytic amount of ortho-phosphoric acid catalyst to yield the low-color esterified oil soluble polyalkylene glycol;
  wherein the low-color esterified oil soluble polyalkylene glycol has a Kinematic Viscosity at 100° C. (KV100) as determined in accordance with ASTM D7042 of 4 mm²/second or less.

2. The process of claim 1, wherein the low viscosity oil soluble polyalkylene glycol and the excess amount of valeric acid are present in a molar ratio from 1.01 moles of acid:1 mole of oil soluble polyalkylene glycol to 10 moles of acid:1 mole of oil soluble polyalkylene glycol.

3. The process of claim 1, wherein the low-color esterified oil soluble polyalkylene glycol has a color as determined in accordance with ASTM D1209 of less than 110 American Public Health Association (APHA) units.

4. The process of claim 1, wherein the low-color esterified oil soluble polyalkylene glycol has a viscosity index as determined in accordance with ASTM D2270 of greater than 160.

5. The process of claim 1, wherein the low-color esterified oil soluble polyalkylene glycol has a viscosity index as determined in accordance with ASTM D2270 of greater than 160 and has a color in accordance with ASTM D1209 of less than 100 APHA units.

6. The process of claim 5, wherein the low-color esterified oil soluble polyalkylene glycol has a KV100 as determined in accordance with ASTM D7042 of 3.2 mm²/second or less.

7. The process of claim 1, wherein the process is a solvent-free process including less than 1.0% by weight of total weight of the reaction mixture.

8. The process of claim 1, further comprising: removing a remaining amount of the excess amount of valeric acid following formation of the low-color esterified oil soluble polyalkylene glycol; and removing the catalytic amount of ortho-phosphoric acid following removal of the remaining amount of the excess amount of valeric acid.

9. The process of claim 8, further comprising recycling the removed remaining amount of the excess amount of valeric acid as an input to the process.

10. The process of claim 1, further comprising removing the low-color esterified oil soluble polyalkylene glycol from an organic phase, and drying the removed low-color esterified oil soluble polyalkylene glycol to yield a dry low-color esterified oil soluble polyalkylene glycol, wherein the dry low-color esterified oil soluble polyalkylene glycol has less than about 5 weight percent by weight of oil soluble polyalkylene glycol based on a total weight of the dried low-color esterified oil soluble polyalkylene glycol.

11. The process of claim 1, wherein the low viscosity oil soluble polyalkylene glycol has a theoretical normal boiling point that is greater than a normal boiling point of the valeric acid.

\*   \*   \*   \*   \*